J. SEIBEL.
Wheel Plow.

No. 47,989                              Patented May 30, 1865.

Witnesses.

Inventor
Jacob Seibel

UNITED STATES PATENT OFFICE.

JACOB SEIBEL, OF MANLIUS, ILLINOIS.

IMPROVEMENT IN GANG-PLOWS.

Specification forming part of Letters Patent No. 47,989, dated May 30, 1865.

*To all whom it may concern:*

Be it known that I, JACOB SEIBEL, of Manlius, in the county of Bureau and State of Illinois, have invented a new and useful Improvement in Gang-Plows; and I do hereby declare that the following is a full, clear, and exact description of the same, reference being had to the accompanying drawings and letters of reference marked thereon, which form a part of this specification, and in which—

Figure 1:
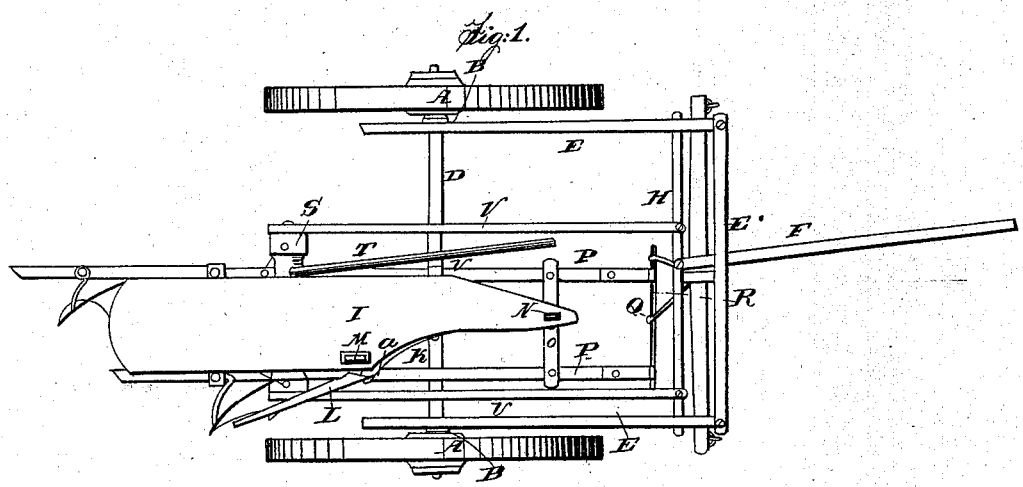
Figure 2:
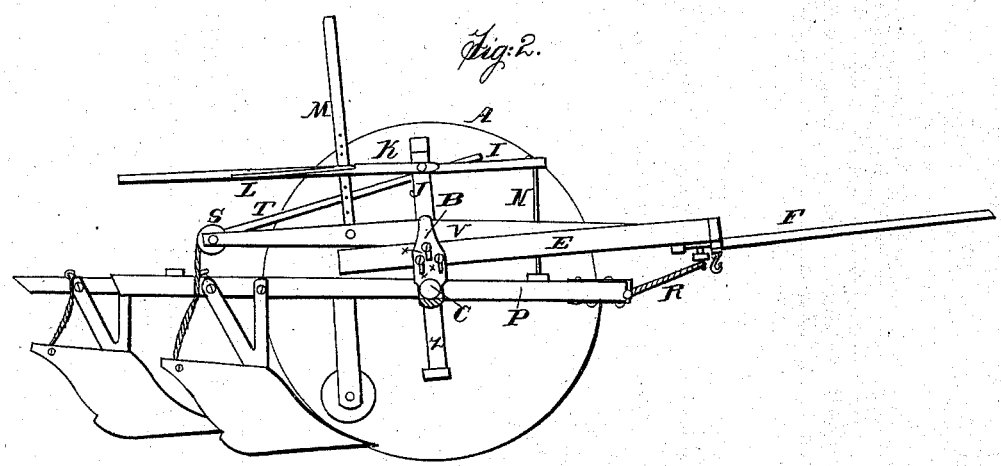

Figure 1 represents a top view of my gang-plow; Fig. 2, a side elevation with one of the wheels removed; and Fig. 3, a detached view of the plow-beam guides, also showing the manner in which the wheels are attached.

The nature of my invention consists in a novel arrangement, whereby both the front and rear ends of the plow-beams may be raised and lowered simultaneously or independently and successively, thus enabling the operator readily to adjust the plows to cut the furrows of any desired depth and at the same time keep the plows level, neither inclining forward or backward, as is the case where the plow-beams are raised and lowered at one end only. By this arrangement, also, the plows may be readily and instantaneously raised up during the operation of plowing, so as to avoid any obstructions in the way, and the obstruction being past, the front ends of the plow-beams may be lowered first to re-enter the plows in the soil, and the rear ends then be adjusted correspondingly.

My invention also consists in a novel arrangement of the tongue of the machine.

To enable those skilled in the art to manufacture and use my invention, I will proceed to describe the same with particularity.

Figure 3:
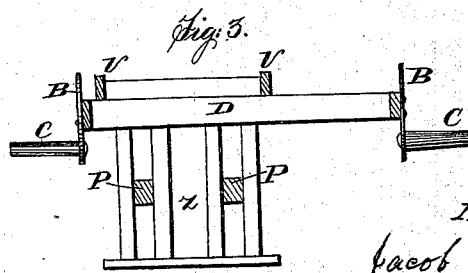

A A represent the wheels, which are any ordinary cultivator-wheels. B B, which are more plainly shown in Figs. 2 and 3, are plates, which attach the spindles C C, on which the wheels run, to the axle D. The spindles C C are firmly attached to the plates B B, and the plates B B are fastened to the axle D by means of screw-bolts passing through the slots $x$, said slots admitting the said plates to be raised and lowered on the axle to adjust the relative heights of the wheels to adapt them to the unevenness occasioned by one wheel running on the unplowed land and the other in the furrow, so as to make the machine level.

E is the main frame of the machine, and F the tongue or draft-pole. The draft-pole passes through the front cross-piece, E, of the main frame in a long mortise or slot, which allows it to move freely sidewise, and it is fastened in the cross-piece H by the pin $y$. The draft of the plow is not applied to the tongue, which leaves it perfectly free to move sidewise when the horses are drawing the plows, and on that account does not fret or worry the horses in the least. The direction of the tongue is such that when I use four horses abreast three of them are allowed to travel on the unplowed ground and the other in the furrow, the direction of the draft guiding the plows laterally, rather than the tongue.

I is the seat for the operator, it being supported upon the standards J, and it is also used as a lever to raise and lower the front of the plow-beams P P, being connected therewith by means of the rod or upright N.

M is a rigid standard, extending up through the seat I, and has holes through it, as shown, for the pin $a$, that is attached to the end of the spring K, by which it is held in place. The lever L is used to throw said pin out of the hole in the standard when it is desired to operate the seat as a lever to raise or lower the plow-beams to regulate the depth of the plows, and by the spring forcing the pin $a$ back into one of said holes the seat is held firm in position again, and the plows remain gaged at the desired depth in the ground.

Between the rear ends of the pieces V V there is a roller, S, to which is attached the lever T. There is also attached to said roller a chain or cord, which is attached to the plow-beams P P, and by throwing the lever T down under the catch U said chain is wound upon the roller S, and the plows are thrown from the ground.

Q and R are the attachments for applying the draft to the plows, W being the double whiffletree, to which the horses are attached. The plows are kept in position and guided by means of the plow-guides Z, which are attached to the axle D.

Having thus described the construction and operation of my gang-plow, what I claim as my invention, and desire to secure by Letters Patent, is—

The combination of the seat I, fulcrumed at J, the perforated standard M, the spring K, provided with the pin a, the lever L, or its equivalent, for operating said spring and pin, the rod N, and plow-beams P, arranged and operating substantially as and for the purposes herein specified and shown.

JACOB SEIBEL.

Witnesses:
 L. L. COBURN,
 W. E. MARRS.